United States Patent [19]

Barke et al.

[11] 4,368,591

[45] Jan. 18, 1983

[54] SEED HAVING HIGH OPACITY COATINGS

[75] Inventors: Martin B. Barke; Rebecca A. Luebke, both of Minneapolis, Minn.

[73] Assignee: Cargill, Incorporated, Minnetonka, Minn.

[21] Appl. No.: 205,891

[22] Filed: Nov. 12, 1980
(Under 37 CFR 1.47)

[51] Int. Cl.³ .............................................. A01C 1/06
[52] U.S. Cl. ................. ............. 47/57.6; 71/DIG. 1
[58] Field of Search .................... 47/57.6, 58, DIG. 9; 71/77, DIG. 1, 93

[56] References Cited

U.S. PATENT DOCUMENTS

| | | | |
|---|---|---|---|
| 3,113,399 | 12/1963 | Eversole et al. | 47/1 |
| 3,497,345 | 2/1970 | Duyfjes | 71/DIG. 1 |
| 4,015,970 | 4/1977 | Hennart | 71/93 X |
| 4,251,952 | 2/1981 | Porter et al. | 47/57.6 |

*Primary Examiner*—Robert E. Bagwill
*Attorney, Agent, or Firm*—Fitch, Even, Tabin, Flannery & Welsh

[57] ABSTRACT

Seeds are coated with an active ingredient and between 0.035 and 1.80 g. of titanium dioxide per kg. of seed in either the rutile or anatase form. The titanium dioxide serves, in conjunction with a coloring agent, to provide a bright, opaque coating to the seed.

10 Claims, No Drawings

SEED HAVING HIGH OPACITY COATINGS

The present invention relates generally to coated seed by the application of protective coatings, and more particularly, it relates to seed having protective coatings including titanium dioxide in amounts sufficient to provide opacity.

BACKGROUND OF THE INVENTION

Coatings have been provided for seeds for a variety of reasons such as increasing water absorption, preventing premature germination, protecting the seed with pesticides, etc. It is required that seed coatings include a coloring agent, such as a dye, so that an observer can immediately determine that the seeds are treated. The purpose of such coloring is, of course, to prevent seed, which may have coated thereon toxic pesticides or the like, from being intermixed with seed, e.g., grain or oilseed, which might be ingested or otherwise exposed to humans or farm animals.

The coloring of coated seed has been found to be advantageous for reasons other than safety reasons. The colored coating is useful to indicate to the manufacturer and consumer the degree of uniformity of the coating applied where uniformity of coating is important, e.g., seeds coated to delay germination. The coloring may serve to hide blemishes which affect the appearance but not the quality of germination of the seed and thereby make the seed more acceptable to consumers. Coloring makes the seed more visable so that it is easier for the planter to ascertain that his equipment is depositing seed in the ground.

The colorings which are commonly used in conjunction with seed coatings have usually resulted in a translucent colored seed coating which, though generally sufficient for distinguishing coated seed from non-coated seed, may be too faint to easily determine the uniformity of coating, to hide seed blemishes or to be clearly visible in contrast to the soil from atop farm machinery. Many seeds have a dark brown or black color on which translucent colored coatings show up poorly. Variegated or mottled seeds such as sunflower seeds may appear to be unevenly coated if coated with a weakly colored coating. Furthermore, while one experienced with seed easily recognizes the foreign color, for coated seeds sold to the uninitiated, such as home gardeners, it is important that coated seeds have distinct coloring so that there is no mistaking the presence of foreign substance thereon.

Various factors may affect the coloring in seed coatings after the coatings have been applied to the seeds. The color may be masked by subsequent additional treating or overtreating coated seeds. The pH of the seed surface may adversely affect the coloring agents in seed coatings.

Accordingly, it would be desirable to provide seeds having coatings with increased opacity and brightness. The coloring should adhere to the seeds during storage and shipping and should remain distinct on the seed even if subsequent coatings are applied to the seed.

SUMMARY OF THE INVENTION

Coated seeds are provided having coatings which include an effective amount of an active ingredient such as fungicides, insecticides, rodenticides, nematocides, bird repellants and miticides and between 0.035 and 1.80 gm of titanium dioxide, in its rutile or anatase form, per kilogram of seed for brightness and opacity. Various colorings or dyes may be used in conjunction with the titanium dioxide to impart a desired opacity and color to the seed. The titanium dioxide is applied to the seed as an aqueous dispersion which may additionally include agents to maintain the titanium dioxide in dispersion, thickening agents, oils and emulsifiers therefore, and agents which serve to adhere the titanium to the seed. It is understood that all ingredients are non-phytotoxic.

DETAILED DESCRIPTION OF THE PREFERRED EMBODIMENTS

Coated seeds are provided having coating including an active ingredient and particulate titanium dioxide in its rutile or anatase form to provide brightness and opacity to the seeds. Preferably, coloring is included in the titanium dioxide coatings to provide a bright, distinct color to the seeds.

Titanium dioxide, in both its anatase and rutile forms, is advantageously used to coat seed because it is generally chemically inert and provides superior covering power and opacity. The rutile form is about 30% more effective than the anatase form as a covering agent and thus less rutile form than anatase form is required. However, the rutile form is more expensive to produce, and the preferred form of titanium dioxide in a particular application will generally be dictated by economic concerns. The amount of titanium dioxide used will vary depending on factors such as the size of the seed and the color of the seed but will be in the range of about 0.35 gm to about 1.40 gm of rutile form or about 0.045 gm to about 1.80 gm of anatase form per kilogram of seed. In order that the titanium dioxide adhere to the seed, the average particle diameter is less than about 80 microns, and in order that the titanium dioxide provide sufficient opacity and brightness, the average particle size is greater than about 10 microns.

Both the rutile and anatase forms of titanium dioxide in their pure forms are white and may be used in coating compositions without further coloring to provide seeds with an opaque white coating. The brightness and opacity of titanium dioxide enhances the color of coloring agents such as dyes which may be added to the seed coating compositions. Thus, titanium dioxide seed coating compositions may have a distinctly foreign color which is chosen, for example, for high contrast with the soil in which it is to be planted. Depending on the coloring agent used and the desired intensity of the color, the coloring agent may be present in amounts of up to about 25% percent of the titanium dioxide. Particular coloring agents which may be used in conjunction with titanium dioxide include but are not limited to Rhodamine B, methyl violet, victoria green, phthalo blue, auramine yellow and Elcomine orange.

The active ingredient is one or more pesticides selected from the class of fungicides, insecticides, rodenticides, nematocides, bird repellants and miticides according to the planting requirements of the seed. Pesticides which may be advantageously applied in protective seed coatings include but are not limited to; thiram, captan, pentachloronitrobenzene, carboxin, methoxychlor and malathion. The pesticides are present in amounts of from about 0.37 to about 2.44 gm per kg of seed.

In addition to pesticides, the coating may include known agents which hasten or delay germination.

The titanium dioxide particles are applied to the seeds as an aqueous dispersion. The dispersion may contain between about 10 and about 100 gm of insoluble titanium dioxide per liter of dispersion. The particulate titanium dioxide may be dispersed in water containing the active ingredient and immediately applied to the seed, for example, in a rotating drum. In most applications, however, it is preferred that an agent be added to help disperse the titanium dioxide and maintain the titanium dioxide particles in suspension so that the seeds may be coated at a later time. In certain applications of this invention, stable aqueous dispersions of titanium dioxide are provided which may be added to commercial seed coating formulations. Dispersing agents which may be used to form stable dispersions of titanium dioxide in the aqueous medium include, but are not limited to; Daxad 30, Sponto 500T, Sponto 934, Sponto 168D and Witcolate 1075X.

In addition to dispersing agents, thickening agents may be included in coating compositions in amounts sufficient to adjust the viscosity to between about 40 to about 90 Ku to help the wet dispersion stick to the seed. Preferred thickening agents include attapulgite clay, Methocel, Attagel and Cab-O-Sil.

As described in co-pending application Ser. No. 41,321 filed May 22, 1979, now U.S. Pat. No. 4,272,417 issued June 9, 1981 many coloring agents destabilize in seed coating compositions, and the compositions may be stabilized by the inclusion of solvents such as polyols at levels of between about 5 percent and about 48 percent by weight of the coating compositions. Polyols which may be used to stabilize compositions which include coloring agents include ethylene glycol, hexylene glycol, propylene glycol, diethylene glycol, glycerol, methylcellosolve and butyl cellosolve.

After the coating has been applied to the seed, the water evaporates leaving a relatively stable coating of titanium dioxide and active ingredient. The titanium dioxide adheres well to most seeds, but for some seeds, particularly those with an oil or a waxy coating, or for applications where it is expected that the seed will be subjected to rough shipping and handling, it is advantageous to include in the coating compositions substances which will increase the adherence of the titanium dioxide to the seed. Oils such as mineral oils or vegetable oil in amounts of between about 45 and about 65 percent by weight of the titanium dioxide will increase the adherence of the titanium dioxide to seed with oily or waxy surfaces. Of course, the oils should be emulsified in the aqueous solution, and suitable emulsifiers are used in conjunction therewith.

Even more durable adherence of the titanium dioxide to the seed surface may be obtained with resinous substances, such as water reducible or latex polymers which may be emulsified in the aqueous solution. Resinous substances may be advantageously used to impart water resistance to the seed where it is desired to delay germination as, for example, when it is desired that the seed not germinate until the weather warms sufficiently. Resinous substances which may advantageously be used in conjunction with titanium dioxide dispersions include but are not limited to; Walpol 40-124, Walpol 40-136, UCAR 360, UCAR 366 and AMSCO RES 3011.

The following examples will generally illustrate ways of practicing this invention:

EXAMPLE I 1 kilogram samples of acid delinted cottonseed, which ranges in color from nearly white to nearly black, is coated with compositions containing ingredients as per Table I below:

TABLE I

| | Rutile $TiO_2$ | Anatase $TiO_2$ | Protectant* | Water | Dye** |
|---|---|---|---|---|---|
| A. | 7.40 g | | 20.4 g | 86.9 ml | .81 ml |
| B. | | 9.62 g | 20.4 g | 86.9 ml | .81 ml |
| C. | | | 20.4 g | 86.9 ml | .81 ml |

*a pesticide-containing product sold under the trade name Flo Pro C
**a liquid dye sold as Evershield Violet Seed Protectant Liquid Dye The ingredients are continually mixed until a homogenous composition is obtained, and immediately thereafter the seed samples are shaken with the respective compositions. The seeds are dried for 30 minutes at room temperature.

Seeds coated with composition C have a non-uniform black violet color with variations in color related to the natural color range of the seed itself. Seeds coated with compositions A and B have a uniform bright violet color.

The samples coated with compositions A, B and C are shaken with 50 gm of an insecticide known as Di-Syston. The seed is spread on paper and allowed to dry at room temperature for two hours.

The samples coated with compositions A and B retain their bright uniform violet color. The seed sample treated with composition C, which contains no $TiO_2$, has lost most of its color and is difficult to distinguish from uncoated seed.

The titanium dioxide, therefore, not only significantly enhances the uniformity and brightness of the color, but stabilizes the coating on the seed so that the color remains even if the seed is further treated.

EXAMPLE II

One kilogram samples of sunflower seed which is naturally black with lighter variegations, are coated with compositions A' and C', which are identical to compositions A and C in Example I except that they contain no dye. The samples of seed are shaken with the two compositions until the coating is completely and evenly distributed onto the seed. The seed is spread out on paper and allowed to dry for 30 minutes at room temperature.

The seed coated with compositions A' has a uniform light yellow color that easily distinguishes it from untreated seed and makes it clearly visible on black soil. The seed treated with composition C', containing seed protectant only, has a faint yellow tinge in the lightly variegated areas.

EXAMPLE III

A composition is prepared by agitating 20.0 parts of water and 3.5 parts of an anionic/nonionic salt of a polyelectrolyte, known as Sponto 500 T. 0.3 part of methycellulose is added, and agitation is continued until hydration is complete. 39.9 parts of rutile titanium dioxide and 1.0 part of a defoamer sold under the trade name Nopco NDW is blended in. A mixture of 11.3 parts of water and 4.0 parts of ethylene glycol are added and mixed until dispersed. Using high speed dispersion, 20.0 parts of mineral oil sold as 8070 Neutral is added slowly, and an emulsion is formed by a single inversion process.

The resulting compositions can be added to common seed treating agents prior to application to seed. The coating which imparts a white color to the seed may be used without further coloring, but dye is preferably added to impart the desired hue. Sufficient amounts of the composition are added to the seed treating agents so that the titanium dioxide forms an opaque layer on the seed. Anatase titanium dioxide may be substituted for rutile titanium dioxide, 1.3 parts of anatase being generally the functional equivalent of 1 part of rutile titanium dioxide.

EXAMPLE IV

A seed coating is prepared by mixing 9.3 g of Flo Pro C Seed Protectant, 11.4 g of rutile $TiO_2$, 39.45 g of water and 0.37 g of Evershield Violet Seed Protectant Liquid Dye. A similar coating is prepared but without the $TiO_2$. The hiding power of the $TiO_2$ containing coating is measured at 12.1×m.²/kg. and the hiding power of the coating without $TiO_2$ is measured at zero on a Pfund Cryptometer, a device manufactured by Koehler Instrument Company, Inc. for measuring the hiding power of coatings.

Sufficient examples have been set forth in the foregoing to permit one skilled in the art to practice the teachings of this invention, but it is well understood among those skilled in the art that precise formulations of many of the materials herein indicated cannot be obtained from the manufacturers and cannot be determined by known chemical analysis techniques. Nevertheless, with the teachings of this disclosure and the specific examples, one skilled in the art can provide stable coating compositions in accordance with the present invention as set forth in the following claims.

What is claimed is:

1. Seed having an exposed coating comprising between about 0.035 and about 1.80 gm. of titanium dioxide per kilogram of seed and an effective amount of an active ingredient, said titanium dioxide having an average particle diameter between about 10 microns and about 80 microns thereby providing the coating with high opacity and brightness whereby the visible characteristics of the coated seeds are substantially enhanced.

2. Seed according to claim 1 wherein said active ingredient is selected from the class consisting of fungicides, insecticides, rodenticides, nematocides, bird repellants and miticides.

3. Seed according to claim 1 wherein said titanium dioxide is in the rutile form in amounts of between about 0.035 and about 1.40 gm per kilogram of seed.

4. Seed according to claim 1 wherein said titanium dioxide is in the anatase form in amounts of from between about 0.0445 and about 1.80 gm per kilogram of seed.

5. Seed according to claim 1 wherein said coating also includes a dispersing agent for titanium dioxide.

6. Seed according to claim 5 wherein said coating also includes a thickening agent.

7. Seed according to claim 1 wherein said coating includes a coloring agent in amounts of between about 0.035 percent and about 0.18 percent by weight of said titanium dioxide.

8. Seed according to claim 1 wherein said coating also includes oil selected from the group consisting of a vegetable oil and a mineral oil in amounts up to about 1.00 gm per kilogram of seed.

9. Seed according to claim 1 wherein said coating also includes an adhering agent in amounts of from about 0.017 to about 1.00 gm per kilogram of seed to adhere said pigment to said seed.

10. Seed according to claim 9 wherein said adhering agent is selected from the class consisting of water reducible binders and latex polymers.

* * * * *

UNITED STATES PATENT AND TRADEMARK OFFICE
CERTIFICATE OF CORRECTION

PATENT NO. : 4,368,591
DATED : January 18, 1983
INVENTOR(S) : Martin B. Barke; Rebecca A. Luebke It is certified that error appears in the above-identified patent and that said Letters Patent is hereby corrected as shown below:

Column 3, line 39, the word "oil" should be --oily--.

Column 4, line 37, after the word "seed" a --,-- should have been inserted.

Column 4, line 5, "Anatase Tio$_2$" should be --Anatase TiO$_2$--.

Column 5, line 14, "TiO$_2$ containing" should be --TiO$_2$-containing--.

In Claim 4, Column 6, line 14, "0.0445" should be --0.045--.

Signed and Sealed this

Ninth Day of August 1983

[SEAL]

Attest:

GERALD J. MOSSINGHOFF

Attesting Officer

Commissioner of Patents and Trademarks